(12) United States Patent
Kniel et al.

(10) Patent No.: US 12,726,082 B2
(45) Date of Patent: Sep. 1, 2026

(54) METHOD FOR CONTROLLING THE TEMPERATURE OF AN ELECTRIC MOTOR, AND FLUID SUPPLY DEVICE

(71) Applicant: Schaeffler Technologies AG & Co. KG, Herzogenaurach (DE)

(72) Inventors: Jonas Kniel, Karlsruhe (DE); Matthias Bauer, Freiburg (DE); Denis Loktev, Bühl (DE); Michael Heilmann, Karlsruhe (DE); Bhanu Seth, Kaiserslautern (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 226 days.

(21) Appl. No.: 18/576,428

(22) PCT Filed: Jul. 4, 2022

(86) PCT No.: PCT/DE2022/100479
§ 371 (c)(1),
(2) Date: Jan. 4, 2024

(87) PCT Pub. No.: WO2023/284912
PCT Pub. Date: Jan. 19, 2023

(65) Prior Publication Data

US 2024/0333101 A1 Oct. 3, 2024

(30) Foreign Application Priority Data

Jul. 14, 2021 (DE) ..................... 10 2021 118 236.0

(51) Int. Cl.
*H02K 9/193* (2006.01)
*G05D 23/19* (2006.01)
(Continued)

(52) U.S. Cl.
CPC ......... *H02K 9/193* (2013.01); *G05D 23/1923* (2013.01); *H02K 9/24* (2013.01); *H02K 11/30* (2016.01)

(58) Field of Classification Search
CPC .......... H02K 9/193; H02K 9/24; H02K 11/30; G05D 23/1923; G05D 23/1919; H02P 29/60
(Continued)

(56) References Cited

U.S. PATENT DOCUMENTS

2018/0126840 A1 5/2018 Yim et al.

FOREIGN PATENT DOCUMENTS

JP 2008236955 A 10/2008
JP 2017229164 A * 12/2017
(Continued)

OTHER PUBLICATIONS

JP2008236955A English translation (Year: 2025).*
JP2017229164A English translation (Year: 2025).*
WO2015067259A1 English translation (Year: 2026).*

*Primary Examiner* — Christopher M Koehler
*Assistant Examiner* — Viswanathan Subramanian
(74) *Attorney, Agent, or Firm* — Suiter Swantz IP

(57) ABSTRACT

A method for controlling a temperature of an electric motor in a vehicle drive train via a fluid supply device having a closed fluid circuit with a fluid pump for conveying a fluid flow, which is to be supplied to the electric motor and which in the process alters its operating temperature. The method comprising comparing one actual value of a safety characteristic value of the electric motor to a predetermined limit value of the safety characteristic value. The method further comprising controlling the fluid flow by switching the fluid supply device between a first operating state and a second operating state at least according to the comparison. In the
(Continued)

first operating state, the fluid flow is adjusted according to a predetermined operating characteristic value of the electric motor. In the second operating state, the fluid flow is adjusted so as to be higher than in the first operating state.

18 Claims, 2 Drawing Sheets

(51) Int. Cl.
*H02K 9/24* (2006.01)
*H02K 11/30* (2016.01)

(58) Field of Classification Search
USPC ............................................... 310/54; 701/22
See application file for complete search history.

(56) References Cited

FOREIGN PATENT DOCUMENTS

| | | | |
|---|---|---|---|
| WO | 2015067259 | A1 | 5/2015 |
| WO | 2021073681 | A1 | 4/2021 |

* cited by examiner

METHOD FOR CONTROLLING THE TEMPERATURE OF AN ELECTRIC MOTOR, AND FLUID SUPPLY DEVICE

CROSS-REFERENCE TO RELATED APPLICATIONS

This application is the U.S. National Phase of PCT Appln. No. PCT/DE2022/100479 filed Jul. 4, 2022, which claims priority to DE 102021118236.0 filed Jul. 14, 2021, the entire disclosures of which are incorporated by reference herein.

TECHNICAL FIELD

The present disclosure relates to a method for controlling the temperature of an electric motor. The present disclosure further relates to a fluid supply device.

BACKGROUND

WO 2015/067259 A1 describes a method for cooling a motor vehicle component, in which a fluid pump that is reversible in the direction of rotation provides a fluid flow for cooling the motor vehicle component.

WO 2021/073681 A1 describes that the fluid flow for cooling is adjusted depending on the speed of the pump and its efficiency.

In a vehicle drive train, an electric motor can provide drive torque to propel the vehicle. The operation of the electric motor and the resulting electrical power loss and furthermore due to the movements in the vehicle drive train and the resulting mechanical power loss can generate heat, which must be dissipated to avoid excessive thermal stress.

SUMMARY

The present invention, according to an exemplary embodiment, adjusts a motor operating temperature of the electric motor more adaptively and operates the electric motor more efficiently. Furthermore, controlling the temperature of the electric motor should be carried out more reliably and in a more energy-saving manner. This allows the electric motor to operate more efficiently. The motor operating temperature of the electric motor can be adjusted more accurately and in a more energy-saving manner. The mechanical and electrical losses of the vehicle drive train when the electric motor is operating can be reduced.

The vehicle drive train can be arranged in a vehicle, preferably in an electric vehicle or a hybrid vehicle.

The electric motor can provide drive torque to propel the vehicle. The electric motor can have a stator fixed to the housing and a rotor that can be rotated relative thereto. The motor operating temperature can be a stator temperature.

In addition to the electric motor as the first electric motor, the vehicle drive train can have a further second electric motor. The second electric motor can provide drive torque to propel the vehicle.

The fluid can be a coolant, for example a cooling oil. The fluid circuit can be a coolant circuit. The fluid flow can be a coolant flow. The coolant flow can cool the electric motor.

A temperature control system may include temperature regulation.

In embodiments, it is advantageous if a predetermined operating characteristic value is a predetermined motor operating temperature of the electric motor, in which it has maximum efficiency at the motor speed and/or motor torque present at the electric motor in operation. The operating characteristic value can be changed during operation of the electric motor depending on the existing motor speed and/or the existing motor torque.

In embodiments, it is provided that a motor operating temperature of the electric motor is calculated depending on the motor speed and/or motor torque present at the electric motor during operation and is provided as a predetermined operating characteristic value. The operating characteristic value can be calculated via a lookup table depending on the motor speed and/or the motor torque present during operation of the electric motor. The fluid flow, in turn, can be calculated depending on the operating characteristic value, for example via a further lookup table, and can in particular be regulated with the operating characteristic value as a control parameter.

The calculated motor operating temperature at which the electric motor has maximum efficiency may decrease as motor torque increases and increase as motor speed increases.

In embodiments, it is advantageous if, in the first operating state, the fluid flow or the motor operating temperature is regulated via the fluid flow depending on at least one measured input operating characteristic value. The input operating characteristic value may be a measured operating characteristic value, for example a measured motor operating temperature, a measured motor speed and/or a measured motor torque of the electric motor.

An embodiment is advantageous in which, each time the electric motor is operated, a first loss characteristic value characterizing an electrical power loss of the electric motor and a second loss characteristic value characterizing a mechanical power loss are recorded and if the second loss characteristic value is below the first loss characteristic value, in each case in the first operating state, the fluid flow is calculated depending on the predetermined operating characteristic value of the electric motor and otherwise depending on a fluid operating temperature of the fluid supply device. This makes it possible to limit the electrical and mechanical power loss when operating the electric motor. The first loss characteristic value can characterize the thermal power generated by mechanical movements during operation of the electric motor as mechanical power loss. The electrical loss characteristic values can characterize the thermal power generated by the electrical operation of the electric motor as electrical power loss.

By adjusting the fluid flow depending on the fluid operating temperature, a lubrication performance for lubricating the mechanical components that cause the thermal energy can be increased. Depending on the first and second loss characteristic values, the fluid flow can be alternately adjusted to reduce the mechanical and electrical power loss.

In embodiments, it is advantageous if the safety characteristic value is a motor operating temperature of the electric motor, a fluid operating temperature of the fluid in the fluid supply device and/or a motor speed of the electric motor. The limit value of the respective safety characteristic value can accordingly be a maximum motor operating temperature, a maximum fluid operating temperature and/or a maximum motor speed. The fluid operating temperature may be the temperature of the fluid in a fluid reservoir.

In embodiments, it is provided that the second operating state is set when the safety characteristic value exceeds the limit value. The first operating state can only be set when the safety characteristic value falls below or reaches the limit value.

If the actual value of the safety characteristic value is below the limit value, the electric motor can be operated safely and reliably. If the safety characteristic value is exceeded, the electric motor or components associated with it can be damaged, particularly depending on the duration and/or the amount of the exceedance.

An embodiment is advantageous in which the switching depends on the actual value of the safety characteristic value of the electric motor as the first safety characteristic value in relation to a predetermined limit value of the first safety characteristic value and further is set depending on an actual value of a second safety characteristic value of the fluid supply device in relation to a predetermined limit value of the second safety characteristic value. As soon as the first safety characteristic value exceeds the predetermined limit value of the first safety characteristic value, or the second safety characteristic value exceeds the predetermined limit value of the second safety characteristic value, the second operating state can be triggered.

An embodiment is advantageous in which the second safety characteristic value is a fluid operating temperature of the fluid. The first safety characteristic value can be a motor operating temperature of the electric motor and/or a motor speed of the electric motor.

Furthermore, the present disclosure provides a fluid supply device for controlling the temperature of at least one electric motor of a vehicle drive train, which has a fluid pump for conveying a fluid flow supplying the electric motor, which is set depending on an operating state altered with a method with at least one of the previously described features.

Further advantages and advantageous embodiments of the present disclosure result from the description of the figures and the drawings.

BRIEF DESCRIPTION OF THE DRAWINGS

The present disclosure is described in detail below with reference to the drawings. In the figures.

DETAILED DESCRIPTION

Figure 1:
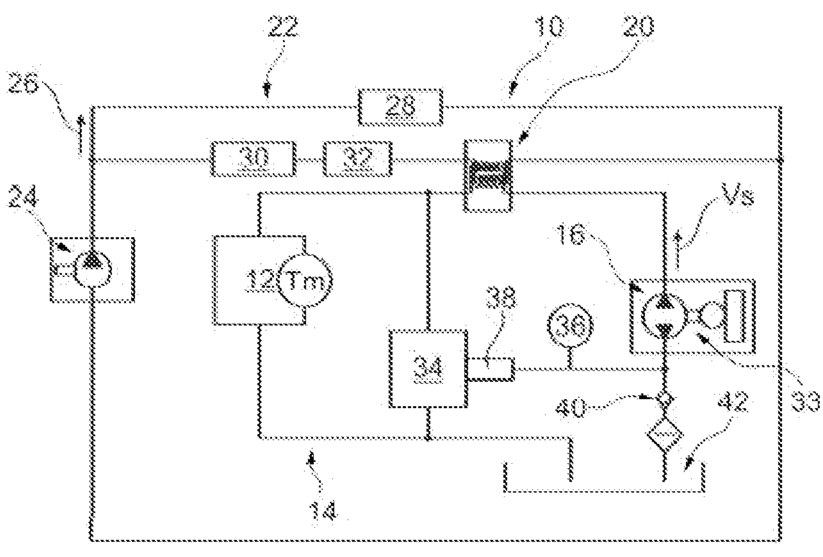
FIG. 1: shows a schematic functional diagram of a fluid supply device in an exemplary embodiment of the present disclosure.

FIG. 1 shows a schematic functional diagram of a fluid supply device 10 in an exemplary embodiment of the present disclosure. The fluid supply device 10 is arranged in a vehicle drive train of a vehicle, which has an electric motor 12 for providing a drive torque for propelling the vehicle. The electric motor 12 has a stator fixed to the housing and a rotor that can be rotated relative thereto about an axis of rotation. During operation of the electric motor 12, there may be a motor operating temperature Tm, which is, for example, a stator temperature of the stator.

The fluid supply device 10 has a closed fluid circuit 14, here a cooling oil circuit, which comprises a fluid pump 16, here a cooling oil pump, which provides a fluid flow Vs, here a cooling oil flow, for supplying the electric motor 12 with the fluid, here the cooling oil. The motor operating temperature Tm of the electric motor 12 is changed by the fluid flow Vs applied to the electric motor 12, here in particular reduced by the fluid flow Vs acting as a cooling oil flow.

The fluid absorbs heat energy from the electric motor 12 and releases it via a heat exchanger 20 to a closed water circuit 22. The water circuit 22 has a water pump 24 for conveying a water flow 26 within the water circuit 22. The water is cooled via a water cooler 28, which releases heat energy from the water to the surrounding air. The water flow 26 can cool power electronics 30 and a converter 32 of the electric motor 12.

The fluid pump 16 can be rotatable in a first direction of rotation or in a second direction of rotation. The fluid pump 16 can be a reversing pump that is actuated by an electric pump actuator 33. During a rotational movement in the first direction of rotation, the fluid flow Vs can be provided for cooling the electric motor 12 and a clutch 34 arranged in the vehicle drive train, for example a K0 clutch. During a rotational movement in the opposite second direction of rotation, a fluid pressure 36 can be built up to actuate the clutch 34 via a clutch actuation device 38. The fluid pressure 36 can be maintained as an actuation pressure via a check valve 40 between the fluid pump 16 and a fluid reservoir 42.

Figure 2:
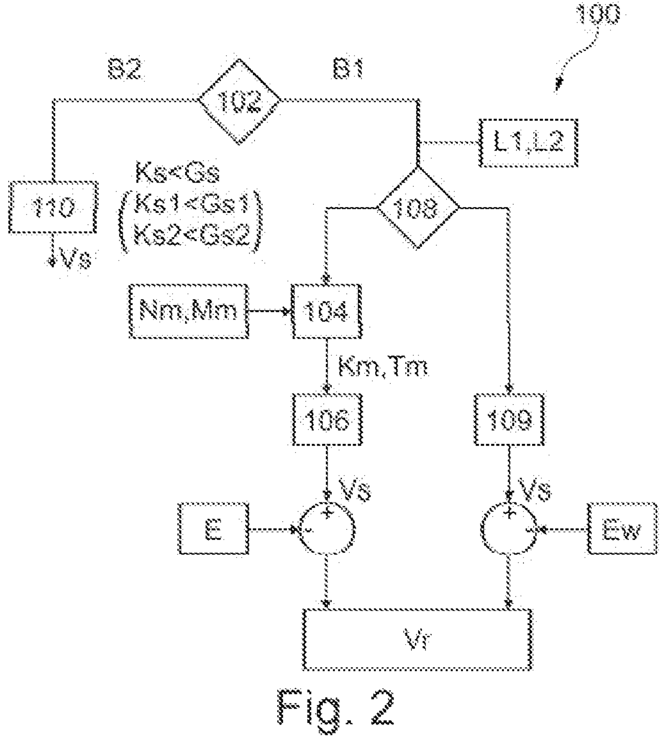
FIG. 2: shows a block diagram of a method in an exemplary embodiment of the present disclosure.

FIG. 2 shows a block diagram of a method in an exemplary embodiment of the present disclosure. The method 100 for controlling the temperature of the electric motor 12 can be performed during operation of the electric motor 12. The fluid flow of the fluid supply device 10 is controlled depending on a query 102. The query 102 checks whether an actual value of a safety characteristic value Ks of the electric motor falls below or reaches a maximum of a predetermined limit value Gs of the safety characteristic value. If this is the case, the fluid supply device is switched to a first operating state B1, in which the fluid flow is set depending on a predetermined operating characteristic value Km of the electric motor 12. The operating characteristic value Km may be a motor operating temperature Tm of the electric motor 12, which is calculated in a calculation step 104 depending on a motor speed Nm present during operation of the electric motor 12 and an existing motor torque Mm and is provided as a predetermined operating characteristic value Km. The motor operating temperature Tm is calculated, for example, using a lookup table in which, depending on the motor speed Nm and the motor torque Mm, a motor operating temperature Tm is specified as the optimal motor operating temperature Tm, at which the electric motor 12 has maximum efficiency and thus minimal power loss.

Figure 3:
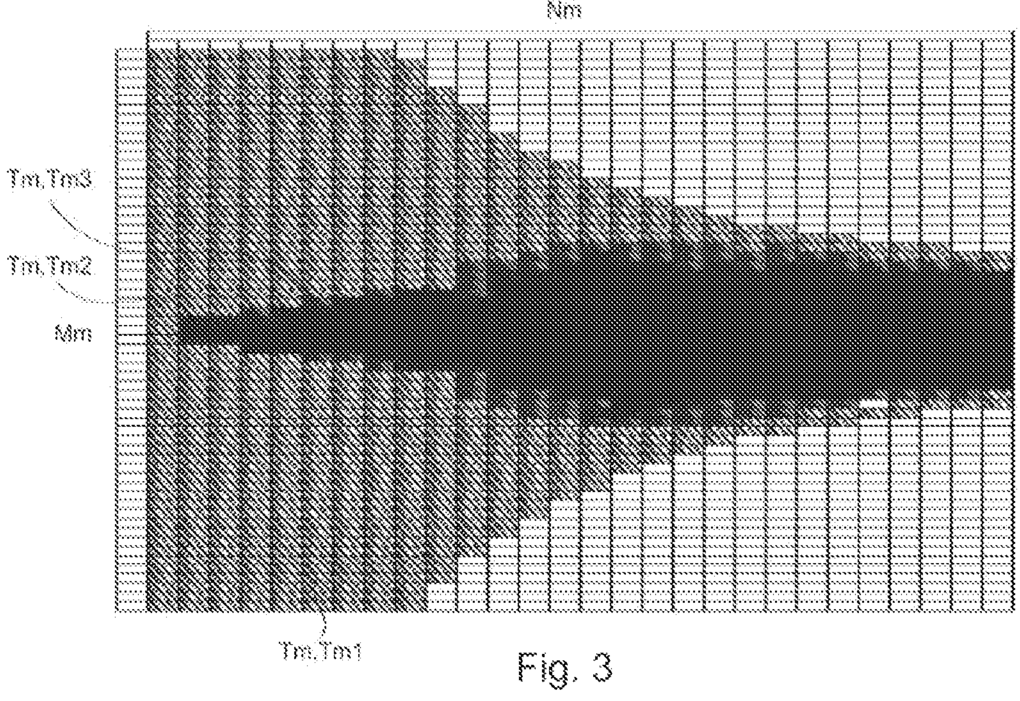
FIG. 3: shows a lookup table of an operating characteristic value for use in a method in an exemplary embodiment of the present disclosure.

FIG. 3 shows an assignment of the optimal motor operating temperature Tm depending on the motor speed Nm and the motor torque Mm of the electric motor 12. Each of the boxes corresponds to a value of the optimal motor operating temperature Tm. As can be seen from FIG. 3, a total of three different values are assumed for the optimal motor operating temperature Tm, which are distributed depending on the motor speed Nm and the motor torque Mm. The first values Tm1 of the motor can be 30° C., the second values Tm2 of the motor operating temperature can be 85° and the third values of the motor operating temperature can be 150° C. As can be seen from the distribution of the first, second and third values Tm1, Tm2, Tm3, the optimal motor operating temperature Tm decreases as the motor torque Mm increases and increases as the motor speed Nm increases.

Returning to FIG. 2, the optimal motor operating temperature Tm is converted as a predetermined operating characteristic value Km in a subsequent step 106 into a fluid flow Vs to be set, which is set by operating the fluid pump 16. The motor operating temperature present on the electric motor 12 is regulated via the fluid flow Vs depending on at least one measured input operating characteristic value E. The input operating characteristic value E is, for example, a measured motor operating temperature. The control allows the actual fluid flow Vr to be present in the fluid supply device 10 for temperature control of the electric motor 12.

The calculation step 104 is preceded by a check 108, in which an electrical power loss is checked via a first loss characteristic value L1 and a mechanical loss is checked via a second loss characteristic value L2. If it is determined during the check 108 that the first loss characteristic value L1 is greater than the second loss characteristic value L2, i.e. the electrical power loss is greater than the mechanical power loss, then in the first operating state the fluid flow Vs becomes dependent on the predetermined operating characteristic value of the electric motor 12 via the calculation step 104 and step 106 and otherwise depending on a fluid operating temperature Tf of the fluid, for example in a fluid reservoir, in a subsequent step 109 as a fluid flow Vs to be altered, which is altered via operation of the fluid pump 16. The actual fluid flow Vr is regulated depending on at least one measured further input operating characteristic value Ew. The further input operating characteristic value Ew is, for example, a measured fluid operating temperature of the fluid in the fluid reservoir. This means that the actual fluid flow Vr can be present in the fluid supply device 10 to adjust the fluid operating temperature.

The query 102 for the actual value of the safety characteristic value Ks checks whether an existing safety characteristic value Ks exceeds a predetermined limit value Gs of the safety characteristic value. If this is the case, then instead of the first operating state B1, the fluid supply device 10 is switched to a second operating state B2, in which a higher fluid flow Vs compared to the first operating state B1 is set in a calculation step 110. If the actual value of the safety characteristic value Ks is below the limit value Gs, the electric motor 12 can be operated safely and reliably and the fluid flow Vs can be controlled to reduce the electrical and mechanical losses with the first operating state B1.

If the safety characteristic value Ks is exceeded, the electric motor 12 or components associated with it can be damaged, particularly depending on the duration and/or the amount of the exceedance. The increased fluid flow Vs with the second operating state B2 can provide maximum cooling performance and/or lubricating performance and thus reduce the electrical and mechanical power loss.

In addition to the safety characteristic value Ks as the first safety characteristic value Ks1, which is, for example, a motor operating temperature Tm of the electric motor, the query 102 also includes a second safety characteristic value Ks2, which is, for example, a fluid operating temperature Tf of the fluid, for example in a fluid reservoir. Switching between the first and second operating states B1, B2 takes place depending on the actual value of the first safety characteristic value Ks1, for example the motor operating temperature Tm, in relation to a predetermined limit value Gs1 of the first safety characteristic value, for example a maximum motor operating temperature, and further depending on an actual value of the second safety characteristic value Ks2 of the fluid supply device, for example a fluid operating temperature in relation to a predetermined limit value Gs2 of the second safety characteristic value, for example a maximum fluid operating temperature. As soon as the first safety characteristic value Ks1 exceeds the predetermined limit value Gs1 of the first safety characteristic value or the second safety characteristic value Ks2 exceeds the predetermined limit value Gs2 of the second safety characteristic value, the second operating state B2 can be triggered. This allows the safety of the electrical and mechanical part of the vehicle drive train to be maintained.

LIST OF REFERENCE SYMBOLS

10 Fluid supply device
12 Electric motor
14 Fluid circuit
16 Fluid pump
20 Heat exchanger
22 Water circuit
24 Water pump
26 Water flow
28 Water cooler
30 Power electronics
32 Converter
33 Electrical pump actuator
34 Clutch
36 Fluid pressure
38 Clutch actuation device
40 Check valve
42 Fluid reservoir
100 Method
102 Query
104 Calculation step
106 Step
108 Check
109 Step
110 Calculation step
Ks Safety characteristic value
Gs Limit value of the safety characteristic value
B1 First operating state
B2 Second operating state
Tm Motor operating temperature
Tf Fluid operating temperature
Nm Motor speed
Mm Motor torque
Km Operating characteristic value
Vs Fluid flow
Vr Actual fluid flow
E Input operating characteristic value
Ew Input operating characteristic value
L1 First loss characteristic value
L2 Second loss characteristic value
Ks1 First safety characteristic value
Ks2 Second safety characteristic value
Gs1 Limit value of the first safety characteristic value
Gs2 Limit value of the second safety characteristic value

The invention claimed is:

1. A method for controlling a temperature of an electric motor of a vehicle drive train via a fluid supply device having a closed fluid circuit with a fluid pump for conveying a fluid flow of a fluid, the method comprising:

comparing one actual value of a safety characteristic value of the electric motor to a predetermined limit value of the safety characteristic value; and controlling the fluid flow by switching the fluid supply device between a first operating state and a second operating state at least according to comparing the one actual value to the predetermined limit value, the fluid being a cooling oil, the fluid pump being rotatable in a first direction of rotation and a second direction of rotation, the fluid supply device comprising a clutch, the fluid flow being provided for cooling the electric motor and the clutch during rotational movement in the first direction of rotation such that the fluid flow alters a motor operating temperature of the electric motor, the fluid pump rotating in the first direction of rotation in the first operating state; and in the second operating state, the fluid flow being provided for building up a fluid pressure for actuating the clutch during rotational movement in the second direction of rotation;

wherein, in the first operating state, the fluid flow is adjusted according to a predetermined operating characteristic value of the electric motor, and, in the second operating state, the fluid flow is adjusted so as to be higher than in the first operating state, wherein each time the electric motor is operated, a first loss characteristic value characterizing an electrical power loss of the electric motor and a second loss characteristic value characterizing a mechanical power loss are compared, and if the second loss characteristic value is below the first loss characteristic value, in the first operating state, the fluid flow is calculated depending on the predetermined operating characteristic value of the electric motor, and otherwise depending on a fluid operating temperature of the fluid supply device.

2. The method according to claim 1, wherein the predetermined operating characteristic value is a predetermined motor operating temperature of the electric motor, in which the electric motor has maximum efficiency at least one of a motor speed or a motor torque present at the electric motor in operation.

3. The method according to claim 1, further comprising calculating a calculated motor operating temperature of the electric motor depending on at least one of a motor speed or a motor torque present at the electric motor during operation, and providing the calculated motor operating temperature as the predetermined operating characteristic value.

4. The method according to claim 1, wherein, in the first operating state, the motor operating temperature is regulated via the fluid flow depending on at least one measured input operating characteristic value.

5. The method according to claim 1, wherein the safety characteristic value is at least one of the motor operating temperature of the electric motor, the fluid operating temperature of the fluid in the fluid supply device, or a motor speed of the electric motor.

6. The method according to claim 1, wherein the second operating state is set when the safety characteristic value equals the predetermined limit value.

7. The method according to claim 1, further comprising:

comparing a second safety characteristic value of the fluid supply device to a predetermined limit value of the second safety characteristic value; and switching between the first operating state and the second operating state further according to comparing between the second safety characteristic value of the fluid supply device and the predetermined limit value of the second safety characteristic value.

8. The method according to claim 7, wherein the second safety characteristic value is the fluid operating temperature of the fluid.

9. A fluid supply device, comprising:

an electric motor;

a clutch; and a fluid pump configured to convey a fluid flow of a fluid supplying the electric motor to alter a motor operating temperature of the electric motor, the fluid pump being selectively switchable between a first operating state and a second operating state based on a comparison between one actual value of a safety characteristic value of the electric motor to a predetermined limit value of the safety characteristic value, the fluid being a cooling oil, the fluid pump being rotatable in a first direction of rotation and a second direction of rotation, the fluid supply device comprising a clutch, the fluid flow being provided for cooling the electric motor and the clutch during rotational movement in the first direction of rotation such that the fluid flow alters the motor operating temperature of the electric motor, the fluid pump rotating in the first direction of rotation in the first operating state; and in the second operating state, the fluid flow being provided for building up a fluid pressure for actuating the clutch during rotational movement in the second direction of rotation;

wherein, in the first operating state, the fluid flow is adjusted according to a predetermined operating characteristic value of the electric motor, and, in the second operating state, the fluid flow is adjusted so as to be higher than in the first operating state, wherein, in the first operating state, the fluid flow is calculated:

based on the predetermined operating characteristic value of the electric motor when a first loss characteristic value is greater than a second loss characteristic value; and based on a fluid operating temperature of the fluid supply device when the second loss characteristic value is greater than or equal to the first loss characteristic value;

wherein the first loss characteristic value characterizes an electrical power loss of the electric motor during operation of the electric motor;

wherein the second loss characteristic value characterizes a mechanical power loss of the electric motor during operation of the electric motor.

10. The fluid supply device according to claim 9, wherein the predetermined operating characteristic value is a predetermined motor operating temperature of the electric motor, in which the electric motor has maximum efficiency at least one of a motor speed or a motor torque present at the electric motor in operation.

11. The fluid supply device according to claim 9, wherein the predetermined operating characteristic value is the motor operating temperature of the electric motor calculated depending on at least one of a motor speed or a motor torque present at the electric motor during operation.

12. The fluid supply device according to claim 9, wherein, in the first operating state, the fluid flow is regulated depending on at least one measured input operating characteristic value.

13. The fluid supply device according to claim 6, wherein the safety characteristic value is at least one of the motor operating temperature of the electric motor, the fluid operating temperature of the fluid in the fluid supply device, or a motor speed of the electric motor.

14. The fluid supply device according to claim 9, wherein:

the fluid pump is configured to be switched to the second operating state when the safety characteristic value equals the predetermined limit value; and the fluid pump is configured to be switched to the first operating state when the safety characteristic value is less than the predetermined limit value.

15. The fluid supply device according to claim 9, wherein the fluid pump is configured to be switched between the first operating state and the second operating state based additionally on a comparison between a second safety characteristic value of the fluid supply device and a predetermined limit value of the second safety characteristic value.

16. The fluid supply device according to claim 15, wherein the fluid pump is configured to be switched to the second operating state when at least one of:

the second safety characteristic value is greater than or equal to the predetermined limit value of the second safety characteristic value; or the safety characteristic value is greater than or equal to the predetermined limit value.

17. The fluid supply device according to claim 15, wherein the fluid pump is configured to be switched to the first operating state when:

the second safety characteristic value is less than the predetermined limit value of the second safety characteristic value; and the safety characteristic value is less than the predetermined limit value.

18. The fluid supply device according to claim 15, wherein the second safety characteristic value is the fluid operating temperature of the fluid.

* * * * *